Jan. 21, 1958     H. B. IRWIN     2,820,317
FISHING FLOAT
Filed May 3, 1954

INVENTOR.
HARRY BASIL IRWIN
BY Dybvig & Jacox
HIS ATTORNEYS

2,820,317
FISHING FLOAT

Harry Basil Irwin, Dayton, Ohio, assignor to Dayton Bait Co., Dayton, Ohio, a corporation of Ohio Application May 3, 1954, Serial No. 427,181

2 Claims. (Cl. 43—43.14)

This invention relates to improvements in fishing floats and more particularly to a float whose specific gravity can be varied for varying conditions of use.

An object of the present invention is the provision of a float provided with normally closed inlets for allowing a governed amount of water or other material to enter the interior of the float for the purpose of altering its specific gravity, and governing its weight so that it can travel a satisfactory distance when thrown. A characteristic common to fishing bobbers or floats is that they are so light that they will not travel far when thrown.

Other objects and advantages reside in the construction of parts, the combination thereof and the mode of operation, as will become more apparent from the following description.

Referring to the drawing, Figure 1 is an elevational view of the fishing float in its assembled form.

Figure 1:
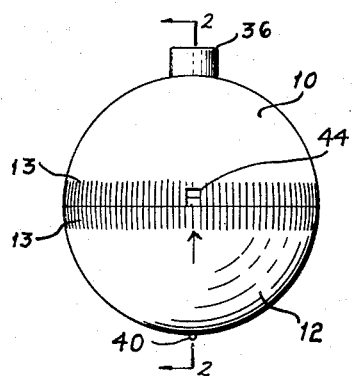
Figure 2:
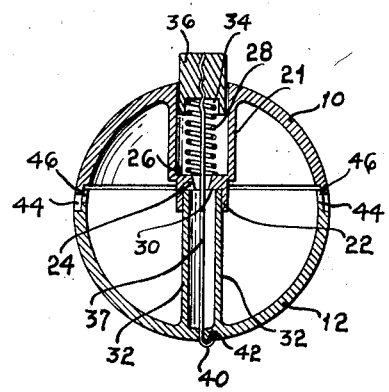
Figure 2 is a vertical sectional view, taken substantially on the line 2—2 of Figure 1.
Figure 3:
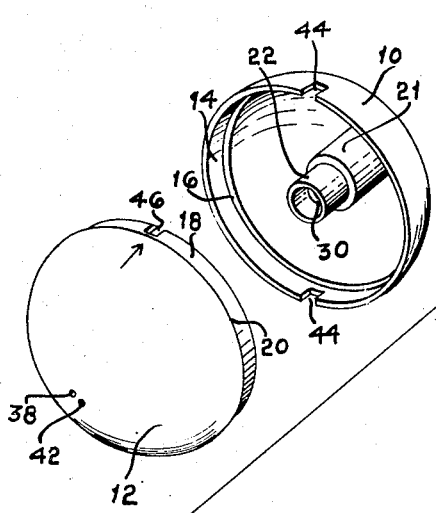
Figure 3 is an exploded view of the elements of the device and in their relative positions prior to assembly.
Figure 3:
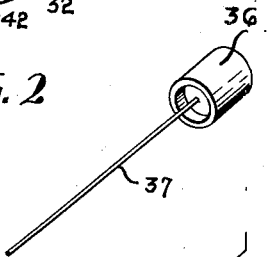

Referring more in detail to the drawing, a pair of partially hollow members or wall sections 10 and 12 of semi-spherical or other suitable shape are secured together to form a spherical housing or enclosure.

As shown in Figure 1 at 13, the portions along the meeting edges of members 10 and 12 are knurled for facilitating gripping and relative turning by hand. An internal annular stepped-in flange portion 14 in the member 10 provides an annular shoulder 16. This configuration is complementary to a corresponding annular overlapping flange portion on the exterior edge 18 of the member 12.

The portions 14 and 18 telescope and the shoulders 16 and 20 abut to form a sphere with an unbroken surface at the juncture when the parts are assembled. The member 10 is provided with a hollow cylindrical projection 21 upon its inner surface. The central axis of this portion lies along a diameter of the sphere.

The hollow cylindrical member 21 is provided with a reduced portion 22 forming an inner annular shoulder 24. The shoulder 24 provides a seat 26 for one end of a spring 28. On its opposite side it provides an abutment 30. A hollow cylindrical member 32 is projected from the interior surface of the opposite half member 12 of the sphere. This cylindrical projection 32 is located on a diameter of the sphere and telescopes into the reduced portion 22, seating upon the abutment 30 when the device is assembled. When fitted together, the members 21 and 32 form a tubular member, separated from the hollow interior of the sphere and located along an axis of the sphere.

The spring 28, as stated above, seats at the inner end upon the seat 26. The opposite end of the spring is seated in a recess 34 in a plunger 36 which is adapted to fit loosely and reciprocate within the cylindrical interior of the projection 21. A wire 37 is rigidly secured to the plunger 36 and extends, when the device is assembled, longitudinally through the center of the spring 28, through the projections 21 and 32, through an opening 38 in the member 12, and terminates in a hook 40.

Plunger 36 is preferably made from a plastic molding material, so that the wire 37 is molded into member 36.

The opening 38 is located at the extremity of the axis of the sphere. The projections 21 and 32 lie along the same axis. The member 12 is also provided with a second opening or notch 42, located near the opening 38 and eccentrically with respect to it.

In assembling the device, the spring 28 is inserted within the cylindrical portion 21 and seated upon the seat 26. The wire 37 is inserted longitudinally through the spring 28, through the cylindrical projection 32, and through the opening 38. It is then bent to form the hook 40. The end of the wire can then seat in the opening or notch 42.

The two spherical sections fit together with the cylindrical projection 32 telescoped within the member 22, and the stepped-in portion of flange 18 telescoped within the flange portion 14. The hook 40 secures them against separation. The hook 40 performs a dual function in that it also engages and positively holds a fish line. The line is easily attached to or detached from the float by simply pressing the plunger 36. The engagement of the members 21 and 32 is water tight, and the area within the enclosure is independent of the spaces within the hollow cylinders 21 and 32.

A plurality of notches 44 are provided along the edge of the member 10. A pair is shown located at diametrically opposite points, but the invention is not limited to this number or this location. They are, however, so located that when the members 10 and 12 are rotated with respect to one another, the notches or openings 44 will all coincide with notches or openings 46 provided in the portion 18. The spherical housing can be held under water and water allowed to enter the coinciding openings on the lower side until a desired weight or specific gravity is obtained. The upper openings permit air to escape. The openings are then closed by again relatively rotating the halves of the float.

The two halves 10 and 12 may be made from plastic material. The edges of the two halves form a water tight seal so that when the notches 44 and 46 are out of registry, the two halves form a water tight float. By moving the two halves so that the notches 44 and 46 register, water may be added to the cavity formed by the two halves, so as to increase the weight, but without filling the cavity and to thereby aid casting. After the desired quantity of water is added, the halves are again rotated to seal the float.

It is to be understood that the invention is not limited to a spherical float or bobber. It could also be elliptical, or any other usable configuration without departing from the spirit of the invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fishing float including a pair of hollow semi-spherical members provided with marginal flange portions and adapted to telescope together to form a substantially spherical housing, said marginal flange portions cooperating to form a watertight joint between said semi-spherical members, each of said semi-spherical members having an inwardly projecting tubular member, said tubular members engaging one another to form a hollow tube extending substantially diametrically within said housing, and yielding means disposed within said hollow tube for drawing said semi-spherical members together, the improvement wherein one of said tubular members has a diameter smaller than that of the other tubular member so as to telescope within said other tubular member, the larger of said tubular members having an internally projecting annular abutment portion therein providing a seat for the end of the smaller of said tubular members whereby a watertight seal is formed between said tubular members, there being a substantially watertight cavity thus formed between said spherical housing and said internal hollow tube, and wherein said marginal flanges are provided with alignable notches forming openings for ingress and egress of fluid to and from said cavity, said semi-spherical members being rotatable one relative to the other so as to selectively align and misalign said notches to selectively open and close said openings.

2. In a fishing float the improvement according to claim 1, wherein each of said semi-spherical members is knurled adjacent the marginal portion thereof so as to facilitate gripping of said members for rotation of one of said members relative to the other.

References Cited in the file of this patent
UNITED STATES PATENTS

| | | |
|---|---|---|
| 1,714,368 | Hobson | May 21, 1929 |
| 2,415,692 | Huston | Feb. 11, 1947 |
| 2,509,704 | Streitwieser | May 30, 1950 |
| 2,527,437 | Matras | Oct. 24, 1950 |
| 2,531,806 | Coughlin | Nov. 28, 1950 |
| 2,683,325 | Sharp | July 13, 1954 |
| 2,706,359 | Beames | Apr. 19, 1955 |

FOREIGN PATENTS

| | | |
|---|---|---|
| 683,430 | Great Britain | 1951 |